US012689885B2

(12) United States Patent
Kulkarni et al.

(10) Patent No.: US 12,689,885 B2
(45) Date of Patent: Jul. 21, 2026

(54) SUPPORTING MULTIPLE EUICC PROFILES

(71) Applicant: NXP B.V., Eindhoven (NL)

(72) Inventors: Giten Kulkarni, Bangalore (IN); Bharath Kumar Giridharan, Bengaluru (IN); Cyril Harold Caillaud, Hamburg (DE)

(73) Assignee: NXP B.V., Eindhoven (NL)

( * ) Notice: Subject to any disclaimer, the term of this patent is extended or adjusted under 35 U.S.C. 154(b) by 820 days.

(21) Appl. No.: 18/053,259

(22) Filed: Nov. 7, 2022

(65) Prior Publication Data

US 2023/0179988 A1 Jun. 8, 2023

(30) Foreign Application Priority Data

Dec. 7, 2021 (EP) ..................................... 21212954

(51) Int. Cl.
*H04W 8/18* (2009.01)
*G06K 19/077* (2006.01)

(52) U.S. Cl.
CPC ...... *H04W 8/183* (2013.01); *G06K 19/07739* (2013.01)

(58) Field of Classification Search
None
See application file for complete search history.

(56) References Cited

U.S. PATENT DOCUMENTS 9,451,098 B2 9/2016 Zhu et al.
9,820,139 B1 11/2017 Veneroso
(Continued)

FOREIGN PATENT DOCUMENTS

JP 2018088156 A * 6/2018
KR 20020005670 A * 1/2002 ........... G06F 16/957
(Continued)

OTHER PUBLICATIONS

ISO/IEC 7816-3:2006 Identification cards—Integrated circuit cards—Part 3: Cards with contacts—Electrical interface and transmission protocols; Third edition, Nov. 1, 2006.
(Continued)

*Primary Examiner* — Jinsong Hu
*Assistant Examiner* — Alexander J Yi

(57) ABSTRACT

The disclosure relates to supporting multiple logical interfaces over a single physical interface, in particular relating to supporting multiple profiles on eSIMs/eUICCs. Example embodiments include an electronic device comprising: an integrated circuit, IC, card domain configured to store a plurality of SIM profiles; and a communication domain coupled to the IC card domain via a physical interface, wherein the communication domain comprises a communication domain interface configured to receive an application command packet, identify one of the plurality of SIM profiles, encapsulate the application command packet with an interface identifier associated with the one of the plurality of SIM profiles in a transport packet and send the transport packet to the IC card domain over the physical interface, and wherein the IC card domain comprises an operating system configured to receive the transport packet, extract the application command packet, send the application command packet to the identified one of the plurality of SIM profiles, receive a response from the identified SIM profile and send the response to the communication domain over the physical interface.

9 Claims, 5 Drawing Sheets

(56)     References Cited

U.S. PATENT DOCUMENTS

| | | | |
|---|---|---|---|
| 11,457,346 | B2 | 9/2022 | Kulkarni et al. |
| 2006/0085848 | A1* | 4/2006 | Aissi .................. H04L 63/0869 |
| | | | 726/9 |
| 2020/0137555 | A1 | 4/2020 | Dos Santos et al. |
| 2020/0296573 | A1* | 9/2020 | Kulkarni ............... H04W 8/183 |

FOREIGN PATENT DOCUMENTS

| | | | |
|---|---|---|---|
| WO | 2013027085 | A1 | 2/2013 |
| WO | 2017027115 | A1 | 2/2017 |

OTHER PUBLICATIONS

ISO/IEC 7816-4:2013 Identification cards—Integrated circuit cards—Part 4: Organization, security and commands for interchange; Third edition, Apr. 15, 2013.
GSMA SGP.22 RSP Technical Specification; Version 2.2.2; Jun. 5, 2020.
Schlumberger et al.; "Integration of the SIM application Toolkit protocol in the UICC specification", 3GPP Draft, T3Z99032, Oct. 27, 1999, pp. 1-27, vol. T WG3, 3rd Generation Partnership Project, Mobile Competence Centre, France, retrieved from the internet at http://www.3gpp.org/ftp/tsg_t/WG3_USIM/adhocs/00-old-meetings/03-9910-Munich/docs/ on Oct. 27, 1999.

* cited by examiner

SUPPORTING MULTIPLE EUICC PROFILES

CROSS-REFERENCE TO RELATED APPLICATIONS

This application claims priority under 35 U.S.C. § 119 to European Patent Application No. 21212954.8, filed on Dec. 7, 2021, the contents of which are incorporated by reference herein.

FIELD

The disclosure relates to supporting multiple logical interfaces over a single physical interface, in particular relating to supporting multiple profiles on eSIMs/eUICCs.

BACKGROUND

An eSIM, or embedded subscriber identification module, is a form of a conventional SIM that is embedded directly into a device rather than being provided as a card that is insertable into a device. Embedded SIMs, also termed eUICCs (embedded Universal Integrated Circuit Cards), are expected to become more widely used in place of conventional SIMs due to their reduction in physical size, greater memory capacity and capability to host multiple profiles, making eSIMs/eUICCs advantageous for being more widely used for devices other than personal communication domains such as cellphones.

SUMMARY

According to a first aspect there is provided an electronic device comprising:

an integrated circuit, IC, card domain configured to store a plurality of SIM profiles; and a communication domain coupled to the IC card domain via a physical interface, wherein the communication domain comprises an interface driver configured to receive a command Application Protocol Data Unit, APDU, identify one of the plurality of SIM profiles from the command APDU, encapsulate the command APDU in a Transport Protocol Data Unit, TPDU, comprising an interface identifier associated with the one of the plurality of SIM profiles and send the TPDU to the IC card domain over the physical interface, and wherein the IC card domain comprises an operating system configured to receive the TPDU, extract the command APDU, send the command APDU to the identified one of the plurality of SIM profiles, receive a response from the identified SIM profile and send the response to the interface driver over the physical interface.

The interface driver may be configured to encapsulate the packet using an ISO 7816-4 Envelope command. In alternative examples a Logical Link Control, LLC, command may be used.

The IC card domain and communication domain may be configured to communicate via the physical interface according to the ISO 7816-3 T=0 transport layer specification.

The electronic device may be a mobile telecommunications device, the communication domain comprising a baseband modem connected to an antenna and an application processor configured to communicate with the baseband modem via a communication interface.

According to a second aspect there is provided a method of operating an electronic device comprising an integrated circuit, IC, card domain configured to store a plurality of SIM profiles and a communication domain coupled to the IC card domain via a physical interface, the method comprising:

an interface driver of the communication domain receiving a command Application Protocol Data Unit, APDU, identifying one of the plurality of SIM profiles from the command APDU, encapsulating the command APDU in a Transport Protocol Data Unit, TPDU, the TPDU comprising an interface identifier associated with the one of the plurality of SIM profiles and send the transport packet to the IC card domain over the physical interface; and an operating system of the IC card domain receiving the TPDU, extracting the command APDU, sending the APDU to the identified one of the plurality of SIM profiles, receiving a response from the identified SIM profile and sending the response to the interface driver of the communication domain over the physical interface.

The interface driver may encapsulate the packet using an ISO 7816-4 Envelope command. In alternative examples the interface driver may encapsulate the APDU using a Logical Link Control, LLC, command.

The IC card domain and communication domain may communicate via the physical interface according to the ISO 7816-3 T=0 transport layer specification.

The TPDU may comprise a header portion and a body portion, the header comprising a first parameter indicating a command for the identified one of the plurality of SIM profiles, a second parameter identifying the one of the plurality of SIM profiles and a third parameter indicating a size of the body portion, the body portion comprising the APDU.

The command may be one of a Get Status, Reset, Create, Activate, Deactivate and Delete command.

The electronic device may be a mobile telecommunications device, the communication domain comprising a baseband modem connected to an antenna and an application processor configured to communicate with the baseband modem via a communication interface.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a non-transitory computer readable medium, which may be a physical computer readable medium, such as a disc or a memory device, or may be embodied as a transient signal. Such a transient signal may be a network download, including an internet download.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
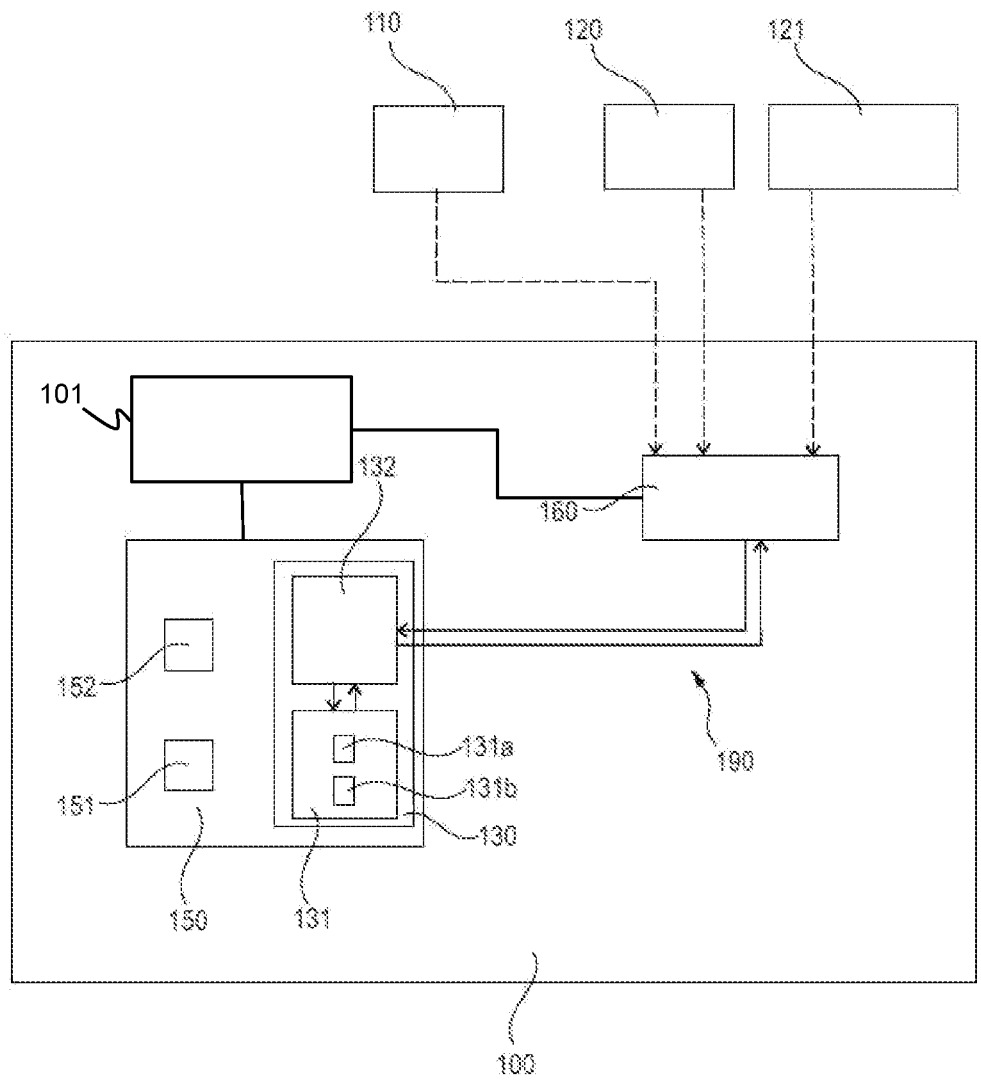
FIG. 1 is a schematic diagram of an example electronic device comprising an eUICC with multiple SIM profiles.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1, derived from EP 3709687 A1, illustrates an electronic device 100 that comprises a secure element domain 150 with a secure element 151 and a secure element operating system (OS) 152. The secure element domain 150 comprises an integrated circuit, IC, card domain 130. The IC card domain 130 comprises an eUICC 131 which stores a first SIM profile 131a and a second SIM profile 131b. The IC card domain 130 further comprises an eUICC OS (card OS) 132 coupled to the eUICC 131. The electronic device 100 further comprises a communication domain 160 coupled to the IC card domain 130 via exactly one single physical interface 190, wherein the physical interface 190 has two communication directions. The communication domain 160 comprises a baseband modem. The physical interface 190 is a contact connection, in particular an ISO 7816 contact interface connection.

The IC card domain 130 is configured to generate a first logical interface on the physical interface 190 and associate the first SIM profile 131a with the first logical interface by providing a first logical interface identifier. The IC card domain 130 is further configured to generate a second logical interface on the physical interface 190 and associate the second SIM profile 131b with the second logical interface by providing a second logical interface identifier. The communication domain 160 is configured to address the first SIM profile 131a, using the first logical interface identifier, in parallel and independent from the second SIM profile 131b and to address the second SIM profile 131b, using the second logical interface identifier, in parallel and independent from the first SIM profile 131a.

The communication domain 160 can be coupled, e.g. in a wireless manner, with a mobile network of a mobile network operator (MNO) 120. In particular, the communication domain 160 can be coupled with two or more mobile networks of different MNOs 120, 121 at the same time. A first mobile network 120 of a first MNO is associated with the first SIM profile 131a, while the second mobile network 121 of the second MNO is associated with the second SIM profile 131b. The mobile networks 120, 121 can be associated with a local profile assistant (LPA) in order to establish or manage a SIM profile 131a, 131b on the IC card domain 130. In addition to the mobile networks 120, 121 of the multiple MNOs, applications on an application processor 101 of the electronic device 100 can also communicate individually with the first SIM profile 131a or the second SIM profile 131b. In the described manner, the SIM profiles 131a, 131b can be managed (through the communication domain 160) at the same time and independent from each other.

Figure 2:
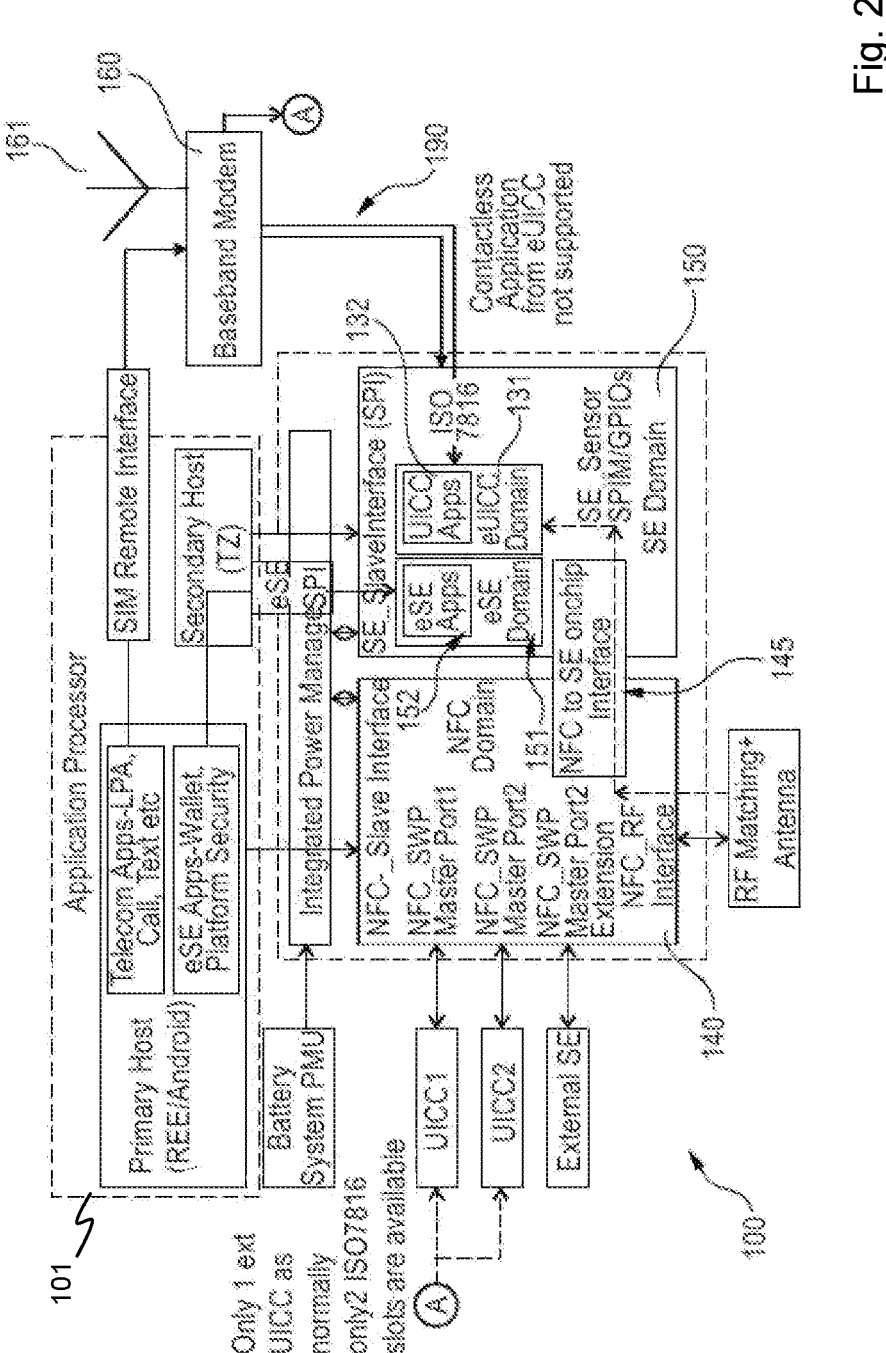
FIG. 2 is a schematic diagram of an example implementation of the electronic device of FIG. 1.

FIG. 2, also derived from EP 3709687 A1, illustrates an example implementation of the described IC card domain 130. An embedded secure element 151 is provided in a secure element domain 150. An NFC domain 140 is coupled via a domain interface 145. The chip is for mobile devices (e.g. smart phones) and supports multiple interfaces (e.g. NFC to contact-less, NFC to host, SPI, ISOUART, I2C) towards different hosts like an external contact-less reader, an application processor, or a (baseband) modem 160. Hereby, the IC card domain 130 and the modem (which forms part of a communication domain 160) can be seen as the described electronic device 100, implemented in a mobile phone. The IC card domain 130 and the communication domain 160 are physically connected via an ISO 7816 contact interface. The communication domain 160 comprises an antenna 161 in order to communicate in a wireless manner with the one or more mobile networks 120, 121.

Figure 3:
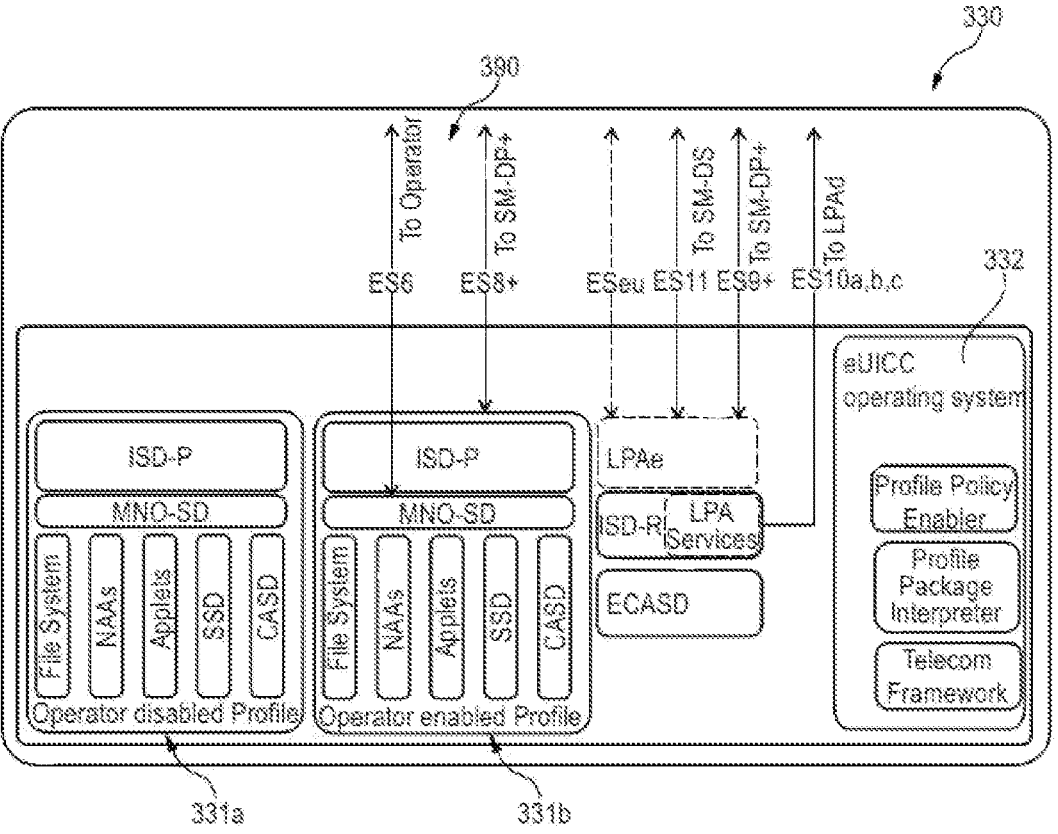
FIG. 3 is a schematic diagram of an example eUICC with multiple SIM profiles.

FIG. 3 illustrates an example integrated circuit (IC) card domain 330 comprising an eUICC (embedded universal integrated circuit card) and an eUICC operating system (OS) 332. A first SIM profile 331a and a second SIM profile 331b are installed on the eUICC. However, as there is only one physical interface 390 between a modem (not shown) and the SIM profiles 331a,b, there can only be one profile active at any time. In the example shown, the second SIM profile 331b is active (enabled) and can be addressed by a modem/operator, while the first SIM profile 331a is disabled. Hence, the first SIM profile 331a can only be activated when the second SIM profile 331b has been disabled.

As described in EP 3709687 A1, although specific SIM architectures allow for dynamic provisioning of a SIM profile and multiple profiles from different MNOs to be installed at the same time, such architectures are limited to having only one active SIM profile, given the limitation of having a single physical interface to the modem. As a consequence, dual or multiple SIM feature are not possible with present SIM architectures. EP 3709687 A1 addresses this problem by defining a logical interface identifier (LII) to each profile and having the modem store the association of a profile and its LII, allowing the modem to use this information for communication with multiple active profiles. A problem with this approach is that it is not backwards compatible with ISO7816-3 T=0 interface and requires the use of a T=1 interface.

ISO7816-3 T=0 maps the higher layer Application PDU header directly on to Transport layer PDU. Not having any Transport PDU fields makes it not possible to add transport level capability extension for logical interface management without needing to modify the ISO7816-4 Application PDU. Modifying the Application PDU, which is owned by the MNO Application, causes data integrity and reliability problems. These limitations mean that it is not possible to support multiple active profiles on UICC/eUICC using the T=0 version of ISO7816.

Figure 4:
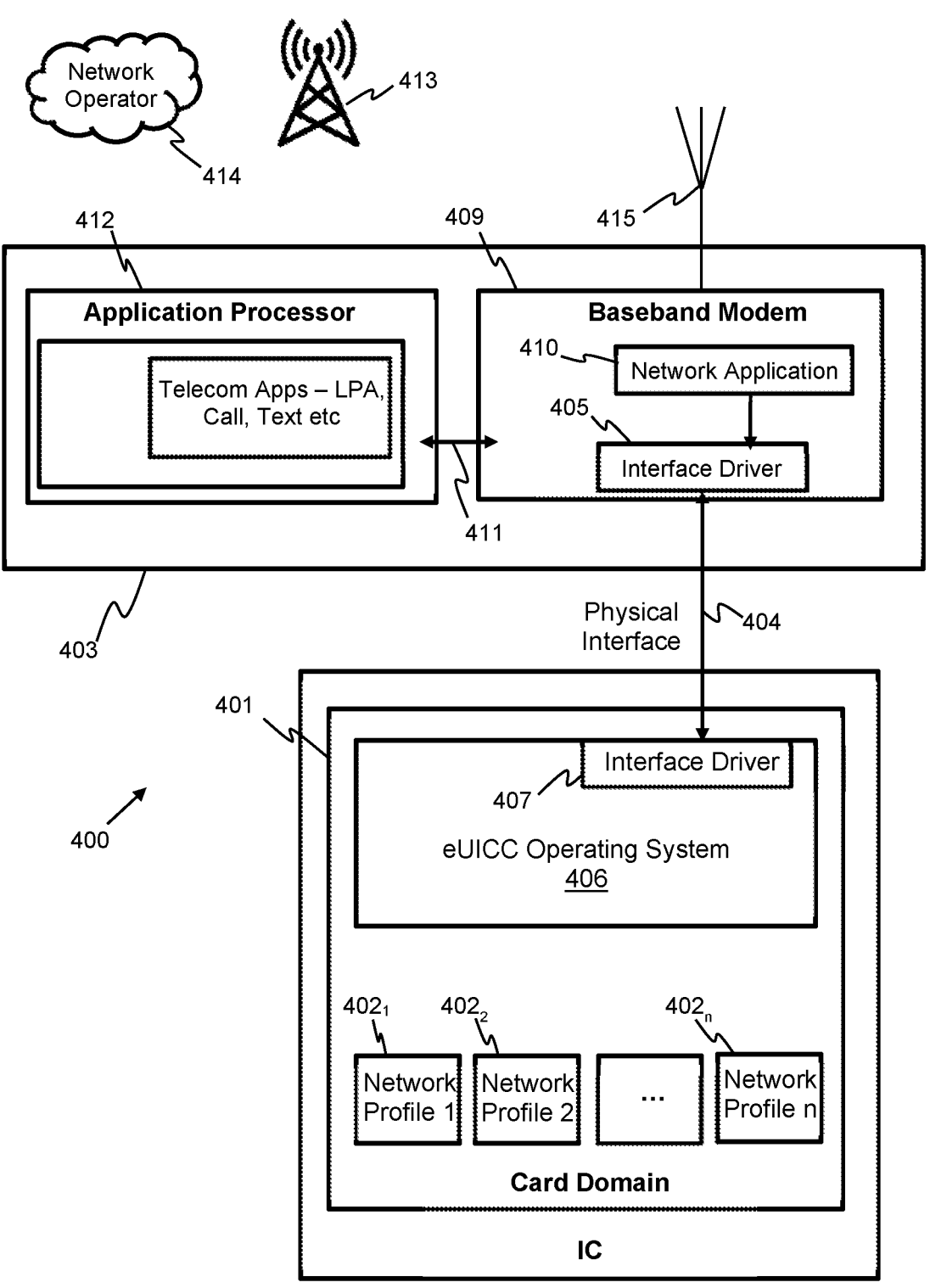
FIG. 4 is a schematic diagram of an example electronic device comprising an IC card domain having multiple SIM profiles.

An example electronic device 400 is illustrated schematically in FIG. 4. The electronic device 400 may for example be, or be part of, a mobile telecommunications device such as a hand-portable cellular telephone or smart phone, or another device requiring a wireless data communications connection. The electronic device 400 comprises an integrated circuit (IC) card domain 401 and a communication domain 403. The communication domain 403 and IC card domain 401 are coupled via a single physical interface 404.

The IC card domain 401 comprises an eUICC operating system 406 incorporating an interface driver 407 that controls communication with a corresponding communication domain interface driver 408 in the communication domain 403 via the physical interface 404. The IC card domain 401 is configured to store a plurality of SIM profiles $402_{1-n}$.

The communication domain 403 comprises a baseband modem 409 that includes a network application 410 and an interface driver 408. The baseband modem 409 communicates over a SIM remote interface 411 with an application processor 412. The application processor 412 may include various applications that require data to be transferred to and from the baseband modem 409. The baseband modem 409 transmits and receives wireless signals to and from a remote cellular base station 413 via an antenna 415, which in turn communicates with a network of a network operator 414.

The interface drivers 407, 408 allow for the IC card domain 401 and the communication domain 403 to transmit application command packets to and receive responses from a selected one of the plurality of SIM profiles $402_{1-n}$. An application command packet, or APDU (Application Protocol Data Unit), is received by the baseband modem 409 and is passed to the communication domain interface driver 405, which identifies one of the SIM profiles $402_{1-n}$ from the packet and encapsulates the packet with an interface identifier associated with the identified SIM profile in a transport packet, or Transport Protocol Data Unit (TPDU). The transport packet is then sent over the physical interface 404 to the IC card domain 401. The interface driver 407 of the IC card domain operating system 406 receives the transport packet, extracts the application command packet and sends the extracted application command packet to the SIM profile identified by the encapsulated transport packet. A response is then received by the operating system 406 from the identified SIM profile and the IC card domain interface driver 407 passes the response back to the communication domain interface driver 405 over the physical interface 404.

An advantage of the use of the interface drivers 405, 407 is that a single physical interface 404 can be used, with transport packets transmitted on the physical interface 404 for example being according to the ISO7816-3 T=0 transport layer specification, allowing for the use of multiple SIM profiles without other components needing to be adapted. The arrangement also allows for the device 400 to be backwards compatible with other components because the encapsulated APDU is provided only between the interface drivers.

ISO7816-4 defines the command structure to be used for handling command ADPUs. A command APDU, shown below in Table 1, comprises a command header and a command body. The command header comprises CLA, INS and P1-P2 fields, indicating the type of command (CLA), an instruction code (INS) and instruction parameters (P1-P2) for the command. The APDU command body comprises Lc and Le length fields, which indicate the number of bytes of command data to follow in a subsequent data field and a maximum number of bytes expected.

TABLE 1

| Command APDU structure according to ISO7816-4 | |
| --- | --- |
| Command Header | Command Body |
| CLA INS P1 P2 | [Lc field] [Data field] [Le field] |

ISO7816-4 provides an Envelope command, which is indicated by INS=0xC2/0xC3, with P1=P2=0x00. This command may be used to encapsulate APDUs by specifying P1 as a logical link packet (LLP) and P2 as a logical interface identifier (LII). A further payload field P3 indicates the size of the payload in bytes. The payload in this implementation is the APDU coming from the application processor 412. For ADPUs that cannot be encapsulated in a single TPDU, the Envelope command can be used for multiple TPDUs until all APDUs are transferred. Each resulting transport protocol data unit (TPDU)) includes a header comprising a TPDU CLA, INS and P1-P3 fields, followed by the APDU, with the P3 field in the TPDU header indicating the size of the APDU payload in bytes, which may be between 0 and 255 bytes. The form of an example TDPU is indicated in Table 2 below. Multiple TPDUs may be provided to transmit all bytes of each APDU in case of an APDU exceeding the P3 upper size limit.

TABLE 2

| Example TDPU structure | |
| --- | --- |
| Header | Payload |
| T-PDU:CLA INS = 0xC2 P1 = LLP P2 = LII P3 (0-255) | P3 Command/A-PDU Bytes |

In alternative implementations, a new INS value may be used instead of the Envelope command, with the resulting TPDU structure differing from that indicated above in Table 2 by INS=LLC instead of 0xC2, with LLC indicating the code for the new Logical Link Control command.

Figure 5:
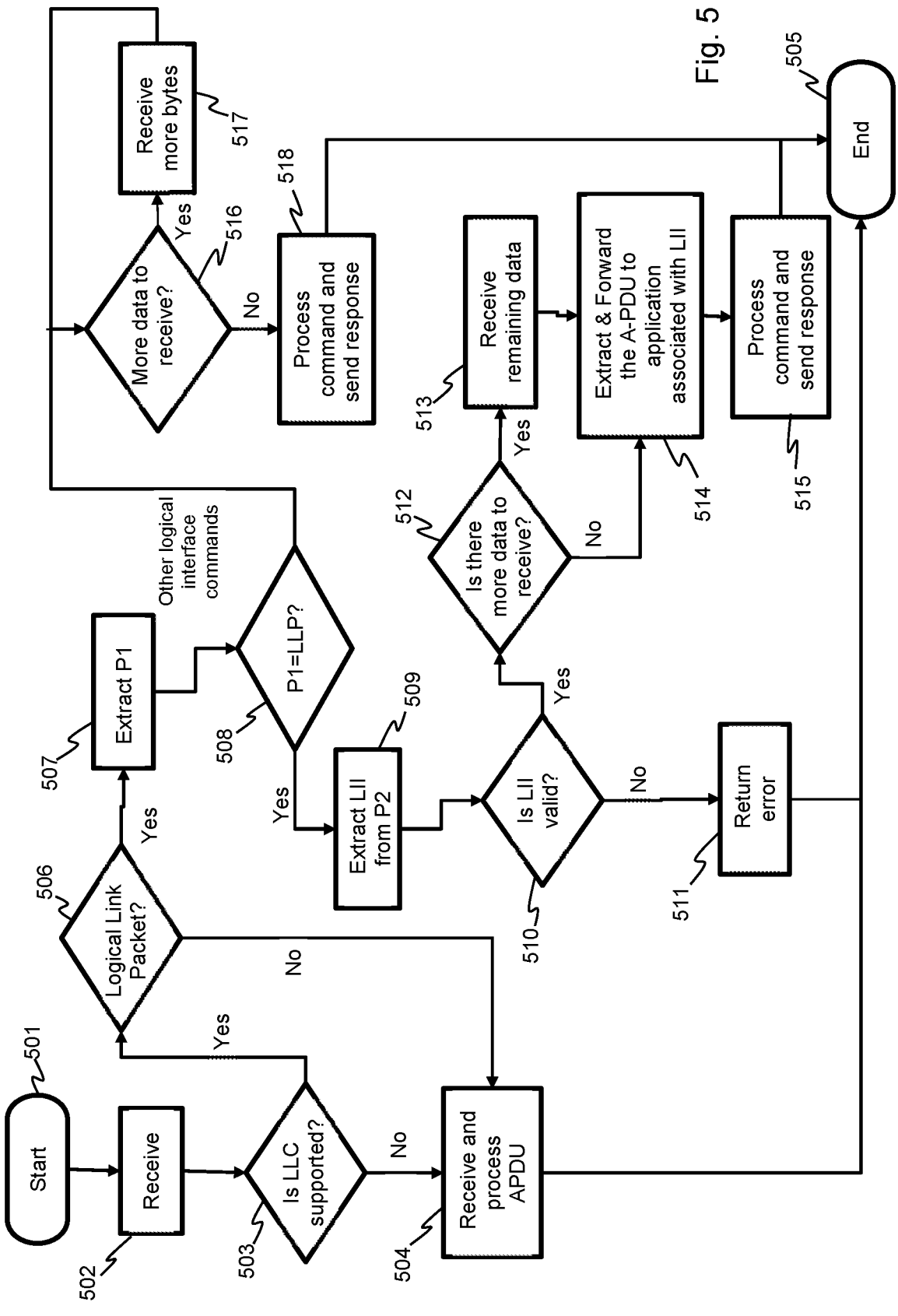
FIG. 5 is a flow diagram illustrating an example sequence of operations to provide a command APDU to a selected SIM profile application.

FIG. 5 illustrates an example flow diagram of a method of implementing a process of handling TPDUs received by the IC card domain interface driver 407 via the physical interface 404 from the communication domain interface driver 405, which receives APDUs from the application processor 412 and encapsulates the ADPUs according to the process described above. The process starts (step 501) and an APDU is received (step 502). A check is made (step 503) to determine whether LLC is supported in the APDU. If LLC is not supported, the command APDU is received and processed (step 504) and the process ends (step 505). If, at step 503, LLC is supported, a check is carried out at step 506 at to whether the APDU is a logical link packet. If not, the packet is received and processed (step 504) and the process ends (step 505). If the packet is a logical link packet, the payload field P1 is extracted (step 507) and a check made to determine whether P1 is equal to LLP (step 508). If P1=LLP, i.e. the TPDU is encapsulated with the Envelope command, the logical interface identifier (LII) is extracted (step 509) and a check is made (step 510) to determine whether the LII is valid. If the LII is not valid, an error is returned (step 511) and the process ends (step 505). If the LII is valid, a check is made as to whether there is any more data to receive (step 512). If so, the remaining data is received (step 513) before the APDU is extracted and forwarded to the application associated with the LII (step 514). If not, the process proceeds straight to extracting and forwarding the ADPU to the application associated with the LII. The command is then processed, and a response is sent (step 515), and the process ends (step 505).

If, at step 508, P1 is not equal to LLP, another logical interface command may be implemented, which includes checking to determine whether there is any more data to receive (step 516) and receiving more bytes if required (step 517), followed by processing the command and sending a response (step 518), following which the process ends (step 505). The process then repeats for each TPDU packet that arrives via the physical interface 404.

As part of the above-described process, one logical interface identifier may be reserved as a root LII that can be used to apply link control commands across all logical channel identifiers.

Prior to the start of the process, on reception of an APDU from the application processor 412, the communication domain interface 405 encapsulates the APDU using an Envelope command (or an LLC command), with the fields P1, P2 and P3 set accordingly.

The modem 409 will typically require a reset of the UICC/eUICC for various reasons, which may conventionally be achieve according to ISO7816-3 by toggling the ISO_RST line, which has the effect of performing a warm or cold reset of the interface and the UICC. In the case of multiple active eUICC profiles such a reset would result in resetting of al UICCs and thereby cause disturbance to other profiles. Other logical link control commands could be coded in the P1 parameter and directed to a reserved link management interface identifier, for example using LII=0. This could for example relate to a Get Status, Reset, Create, Activate, Deactivate or other type of operation. Such operations may have additional parameters, which may be transferred as a payload, for example which LII to reset, create or delete. The payload field P3 can be used to indicate the length of any additional command data. Such commands may be reserved for use by only the modem (the interface master according to ISO7816). A command issuing from the application processor would be ignored.

Table 3 below indicates example TPDU structures for performing a selective reset, create or delete command on a defined SIM profile indicated by the payload.

TABLE 3

Example TDPUs for performing Reset,
Create and Delete commands

| Header | Payload |
| --- | --- |
| T-PDU CLA INS = 0xC2/LLC P1 = LLReset LI P2 = LII_0 P3 = (0-255) | LII #s to Reset |
| T-PDU CLA INS = 0xC2/LLC P1 = LLCreate LI P2 = LII_0 P3 = (0-255) | LII #s to Create |
| T-PDU CLA INS = 0xC2/LLC P1 = LLDelete LI P2 = LII_0 P3 = (0-255) | LII #s to Delete |

From reading the present disclosure, other variations and modifications will be apparent to the skilled person. Such variations and modifications may involve equivalent and other features which are already known in the art of memory systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. An electronic device comprising:

an integrated circuit (IC) card domain configured to store a plurality of SIM profiles; and a communication domain coupled to the IC card domain via a physical interface, wherein the communication domain comprises an interface driver configured to receive a command Application Protocol Data Unit (APDU) identify one of the plurality of SIM profiles from the command APDU, encapsulate the command APDU in a Transport Protocol Data Unit (TPDU) comprising an interface identifier associated with the one of the plurality of SIM profiles and send the TPDU to the IC card domain over the physical interface, and wherein the IC card domain comprises an operating system configured to receive the TPDU, extract the command APDU, send the command APDU to an identified one of the plurality of SIM profiles, receive a response from the identified SIM profile and send the response to the interface driver over the physical interface;

wherein the TPDU includes a header portion and a body portion, the header portion comprising a first parameter indicating a command for the identified one of the plurality of SIM profiles, a second parameter identifying the one of the plurality of SIM profiles, and a third parameter indicating a size of the body portion, and the body portion comprising the command APDU.

2. The electronic device of claim 1, wherein the interface driver is configured to encapsulate a packet using an ISO 7816-4 Envelope command.

3. The electronic device of claim 1, wherein the IC card domain and communication domain are configured to communicate via the physical interface according to the ISO 7816-3 T=0 transport layer specification.

4. The electronic device of claim 1, wherein the electronic device is a mobile telecommunications device, the communication domain comprising a baseband modem connected to an antenna and an application processor configured to communicate with the baseband modem via a communication interface.

5. A method of operating an electronic device comprising an integrated circuit (IC) card domain configured to store a plurality of SIM profiles and a communication domain coupled to the IC card domain via a physical interface, the method comprising:

an interface driver of the communication domain receiving a command Application Protocol Data Unit (APDU) identifying one of the plurality of SIM profiles from the command APDU, encapsulating the command APDU in a Transport Protocol Data Unit (TPDU) the TPDU comprising an interface identifier associated with the one of the plurality of SIM profiles and send the transport packet to the IC card domain over the physical interface; and an operating system of the IC card domain receiving the TPDU, extracting the command APDU, sending the APDU to the identified one of the plurality of SIM profiles, receiving a response from the identified SIM profile and sending the response to the interface driver of the communication domain over the physical interface;

wherein the TPDU includes a header portion and a body portion, the header portion comprising a first parameter indicating a command for the identified one of the plurality of SIM profiles, a second parameter identifying the one of the plurality of SIM profiles, and a third parameter indicating a size of the body portion, and the body portion comprising the command APDU.

6. The method of claim 5, wherein the interface driver encapsulates a packet using an ISO 7816-4 Envelope command.

7. The method of claim 5, wherein the IC card domain and communication domain communicate via the physical interface according to the ISO 7816-3 T=0 transport layer specification.

8. The method of claim 5, wherein the command is one of a Get Status, Reset, Create, Activate, Deactivate and Delete command.

9. The method of claim 5, wherein the electronic device is a mobile telecommunications device, the communication domain comprising a baseband modem connected to an antenna and an application processor configured to communicate with the baseband modem via a communication interface.

\* \* \* \* \*